(No Model.)
J. A. KOELSCH.
NECK YOKE.
No. 539,433. Patented May 21, 1895.
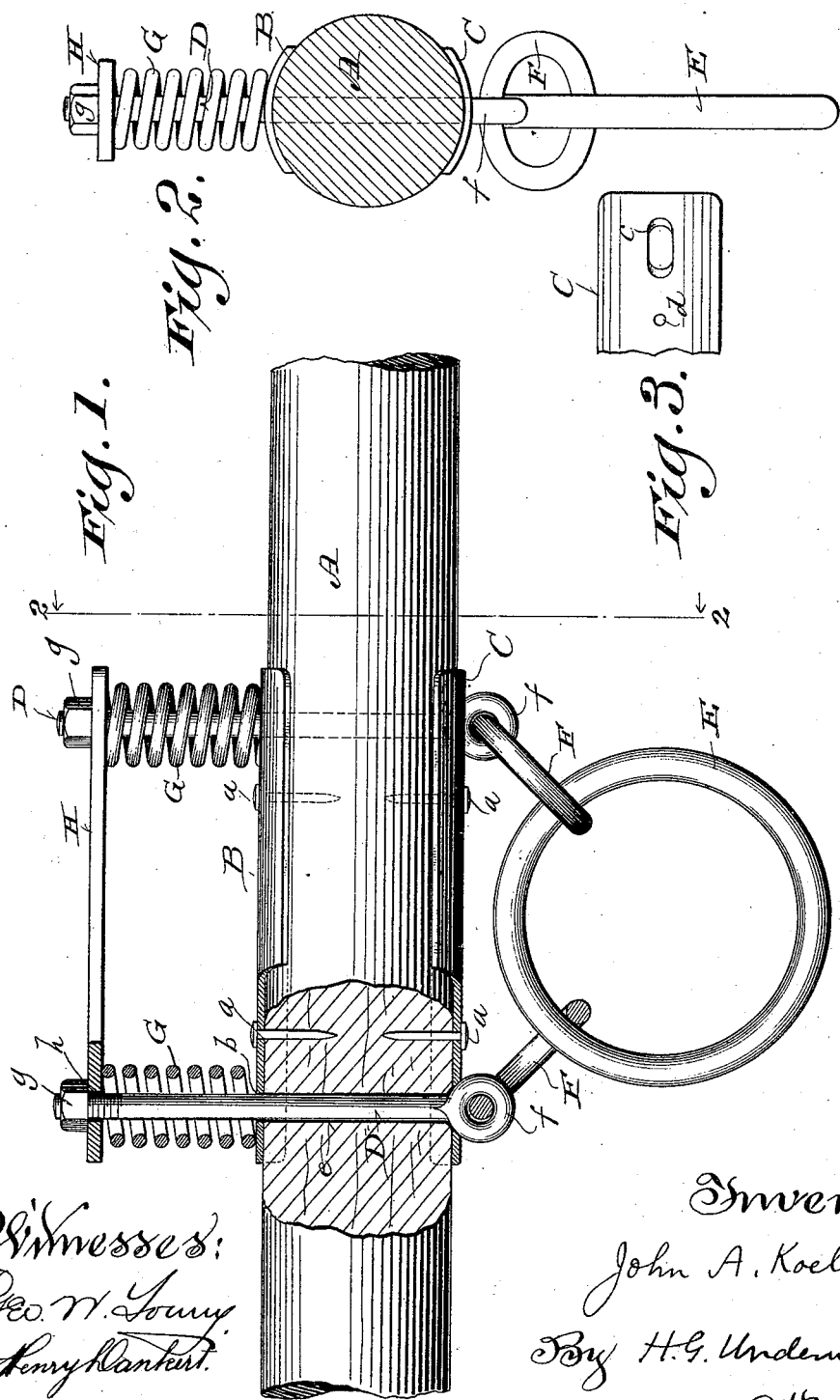

UNITED STATES PATENT OFFICE.

JOHN A. KOELSCH, OF MILWAUKEE, WISCONSIN.

NECK-YOKE.

SPECIFICATION forming part of Letters Patent No. 539,433, dated May 21, 1895.

Application filed February 13, 1895. Serial No. 538,173. (No model.)

*To all whom it may concern:*

Be it known that I, JOHN A. KOELSCH, a citizen of the United States, and a resident of Milwaukee, in the county of Milwaukee and State of Wisconsin, have invented certain new and useful Improvements in Neck-Yokes; and I do hereby declare that the following is a full, clear, and exact description thereof.

My invention relates to neck-yokes and consists in certain peculiarities of construction and combination of parts as will be fully set forth hereinafter and subsequently claimed.

In the drawings, Figure 1 is a representation of the central portion of a neck-yoke embodying my invention, shown partially broken away or in section to better illustrate details of construction. Fig. 2 is a vertical sectional view through said neck-yoke on line 2 2 of Fig. 1, illustrating my invention in end elevation. Fig. 3 is a detail view of the outer side of one end of the under face-plate.

A represents a neck-yoke bar of ordinary construction, provided with upper and under face-plates, B, C, curved to correspond to the external shape of said bar, and secured thereto, as by nails $a$ $a$, or other suitable fastening devices, passing through holes $d$ in said plates. The upper face-plate B is provided near each end with a round hole $b$, and the under face-plate C is provided with an oblong $c$ near each end, the holes in both plates, when the latter have been secured to the bar A, being in line with vertical transverse bores $e$, in said bar for the reception of the eye-bolts D, the described oblong holes $c$ in the under-plate being for the reception of the eyes $f$ of said eye-bolts, and said holes $c$ being preferably formed with downwardly and outwardly beveled end-walls, as shown. E represents the pole ring, and F F smaller rings connecting the latter with the eyes $f$ of the eye-bolts D.

The shanks of the eye-bolts D extend upward above the bar A for a considerable distance to receive stout spiral springs G and a flat tension plate H, provided with round holes $h$ near its ends, the upper ends of the eye-bolts D passing through these holes $h$ and being screw-threaded to receive nuts $g$.

The operation of my device will be readily understood from the foregoing description of its construction, taken in connection with the accompanying drawings.

With the ordinary neck-yokes in common use there is considerable jar and shock attendant upon their use, especially when very heavy loads are carried, and to obviate this is one of the principal objects of my present invention.

By means of the described springs G, which can be adjusted to any degree of tension required by the nuts $g$, and which will yield under any sudden strain, the pounding upon the horses' necks is done away with, and consequent soreness prevented, this being of especial advantage in such work as grading, road-scraping, and the like.

The beveled-walled oblong holes $c$ in the under face-plate C serve to retain the eyes of the bolts D in their original position, and thereby keep the pole-ring E in line with the bar A, which is another advantage, as thereby twisting of the said bar is prevented, and if, owing to the compression of the spring, the eye $f$ is driven from its seat, the beveled walls of the slot $c$ will aid its automatic restoration thereto, when the spring again expands.

Having thus described my invention, what I claim as new, and desire to secure by Letters Patent, is—

1. In a neck-yoke, the combination with the bar thereof, of eye-bolts having extended shanks passed transversely through and projecting beyond the same, coiled springs surrounding said extended shanks to compensate for the movement of the pole in either direction, a tension plate and nuts upon the ends of said shanks beyond the said springs to adjust the tension of each spring independently, and a pole-ring suspended from the opposite ends of said eye-bolts, substantially as set forth.

2. In a neck-yoke, the combination with the bar thereof provided with transverse perforations, and a face-plate on the under side of said bar provided with oblong beveled-walled slots in line with said perforations, of spring-controlled movable bolts passed through said perforations and having eyes in engagement with said slots, rings in engagement with said eyes, and a pole-ring suspended from said last named rings in line with said bar, substantially as set forth.

In testimony that I claim the foregoing I have hereunto set my hand, at Milwaukee, in the county of Milwaukee and State of Wisconsin, in the presence of two witnesses.

JOHN A. KOELSCH.

Witnesses:
H. G. UNDERWOOD,
HENRY DANKERT.